United States Patent
Takahara et al.

(10) Patent No.: US 8,417,401 B2
(45) Date of Patent: Apr. 9, 2013

(54) MAP DISPLAY APPARATUS, MAP DISPLAY METHOD, AND COMPUTER-READABLE TANGIBLE MEDIUM

(75) Inventors: Masatoshi Takahara, Okazaki (JP); Toshiaki Niwa, Okazaki (JP)

(73) Assignees: Aisin AW Co., Ltd., Anjo (JP); Toyota Jidosha Kabushiki Kaisha, Toyota (JP)

( * ) Notice: Subject to any disclaimer, the term of this patent is extended or adjusted under 35 U.S.C. 154(b) by 0 days.

(21) Appl. No.: 12/452,618

(22) PCT Filed: Jul. 17, 2008

(86) PCT No.: PCT/JP2008/062937
§ 371 (c)(1),
(2), (4) Date: Jan. 12, 2010

(87) PCT Pub. No.: WO2009/011393
PCT Pub. Date: Jan. 22, 2009

(65) Prior Publication Data
US 2010/0138098 A1    Jun. 3, 2010

(30) Foreign Application Priority Data
Jul. 19, 2007 (JP) .................................. 2007-188090

(51) Int. Cl.
*B60L 3/00* (2006.01)
(52) U.S. Cl.
USPC ............................ 701/22; 701/29.1; 701/34.4
(58) Field of Classification Search .................... 701/22, 701/29.1, 34.4, 36; 903/903, 907; 702/63
See application file for complete search history.

(56) References Cited

U.S. PATENT DOCUMENTS

| 5,539,399 A | 7/1996 | Takahira et al. |
| 5,623,194 A | 4/1997 | Boll et al. |
| 5,686,895 A | 11/1997 | Nakai et al. |
| 2010/0094496 A1* | 4/2010 | Hershkovitz et al. ............ 701/22 |
| 2010/0280687 A1* | 11/2010 | Tate et al. ........................ 701/22 |

FOREIGN PATENT DOCUMENTS

| DE | 43 44 368 C1 | 5/1995 |
| EP | 1 275 936 A2 | 1/2003 |
| JP | A-7-85397 | 3/1995 |
| JP | A-9-233720 | 9/1997 |
| JP | A-2000-283774 | 10/2000 |
| JP | A-2000-292195 | 10/2000 |

(Continued)

OTHER PUBLICATIONS

International Search Report issued in International Application No. PCT/JP2008/062937; Mailed Oct. 28, 2008.

(Continued)

*Primary Examiner* — Richard M. Camby
(74) *Attorney, Agent, or Firm* — Oliff & Berridge, PLC

(57) ABSTRACT

A navigation apparatus for use in a hybrid vehicle in which an engine and a drive motor are used in combination acquires a current SOC value of a battery, geometry of roads around the vehicle, gradient information, traffic information, learning information, and so forth. A travelable range of the vehicle after the battery is charged is calculated for each of a plurality of various charge times on the basis of the acquired information. The plurality of calculated travelable ranges is simultaneously displayed on a liquid crystal display. It is thus possible to display a minimum charge time required to travel to a destination in a manner easily understandable to a user.

9 Claims, 6 Drawing Sheets

FOREIGN PATENT DOCUMENTS

| | | |
|---|---|---|
| JP | A-2001-112121 | 4/2001 |
| JP | A-2001-215124 | 8/2001 |
| JP | A-2003-294463 | 10/2003 |
| JP | A-2004-270604 | 9/2004 |
| JP | A-2005-198445 | 7/2005 |
| JP | A-2006-112932 | 4/2006 |
| JP | A-2006-115623 | 4/2006 |

OTHER PUBLICATIONS

Jul. 23, 2012 Supplementary European Search Report issued in Application No. EP 08 79 1291 (with translation).

* cited by examiner

ND DISPLAY
MAP DISPLAY APPARATUS, MAP DISPLAY METHOD, AND COMPUTER-READABLE TANGIBLE MEDIUM

TECHNICAL FIELD

The present invention relates to a map display apparatus, a map display method, and a computer-readable tangible medium that allow display of a travelable range of a vehicle.

BACKGROUND ART

In on-vehicle navigation apparatuses, portable information devices such as PDAs (Personal Digital Assistants) and cellular phones, and personal computers according to related art, it is possible to store map information on roads such as ordinary roads and highways, names of facilities, and so forth in various storage devices or to download such map information from a server or the like in order to show a map of a desired area to a user.

In recent years, various types of electric drive vehicles have been provided, such as electric vehicles in which a motor driven by electric power supplied from a battery is used as a drive source and hybrid vehicles in which a motor and an engine are used in combination as drive sources. In general, the battery of the electric drive vehicle is charged at home or at a dedicated charge facility. However, compared to refilling an engine with gasoline or other fuel, the electric drive vehicle requires a long time for battery charging in order to be supplied with an amount of energy required for traveling the same distance. Thus, when the remaining amount of the battery is low, drivers often prefer to charge the battery only by an amount required for the trip to be made, and not up to full amount. Thus, for electric drive vehicles in which a motor is used as a drive power source, it is important to inform the user of how far the vehicle can travel for a charge time of the battery, that is, a range in which the vehicle can travel (hereinafter referred to as a "travelable range") before electric power accumulated in the battery after being charged for a predetermined charge time is used up (with combined use of an engine in the case of hybrid vehicles).

With this in view, related art proposes to provide the user with a travelable range based on the charge time described above using a device having a map display function such as a navigation apparatus. For example, Japanese Patent Application Publication No. JP-A-2003-294463 describes a navigation apparatus for an electric vehicle that allows the user to input a desired battery charge time and displays a travelable range of the vehicle corresponding to the input charge time.

Patent Document 1: Japanese Patent Application Publication No. JP-A-2003-294463 (page 5, FIG. 14)

DISCLOSURE OF THE INVENTION

Problem to be Solved by the Invention

The navigation apparatus described in Patent Document 1 mentioned above displays only the travelable range corresponding to the desired charge time input by the user. However, the user may desire to know the minimum charge time required to reach a desired destination during travel from the displayed travelable range. This is because it takes a long time to charge the battery as described above and thus in many cases the user may desire to charge the battery only by the minimum amount required to reach the destination. In order to know the minimum charge time required to reach the destination with the navigation apparatus described in Patent Document 1, however, the destination must be displayed within the travelable range and near the far end of the travelable range.

Thus, if the destination desired by the user does not fall within the travelable range displayed on the map, the user is obliged to repeatedly input various charge times until the destination is included in the travelable range. But even if the destination desired by the user is included in the travelable range, if the destination is located near the center of the map, the user is still obliged to repeatedly input various charge times until the destination is located near the far end of the travelable range. In short, the navigation apparatus described in Patent Document 1 obliges the user to perform intricate operations that may take a long time in order to acquire knowledge of the charge time required to reach a destination.

The present invention was devised to resolve the foregoing problem of the related art, and it is an object of the present invention to provide a map display apparatus, a map display method, and a computer-readable tangible medium that allow display of a minimum charge time required to travel to a destination in a manner that is easily understandable by a user, without obliging the user to perform intricate operations that may take a long time, and that save the user from charging a battery more than necessary to enhance the convenience experienced by the user.

Means for Solving the Problem

In order to achieve the foregoing object, the present invention provides a map display apparatus (1) including: a display device (15) that displays a map of an area around a vehicle; a battery remaining amount acquisition device (33) that acquires a remaining amount of a battery (7) that supplies electric power to a motor (5) that produces a drive force for the vehicle (2); a travelable range calculation device that calculates a travelable range of the vehicle after the battery is charged for each of a plurality of various charge times on the basis of the remaining amount of the battery acquired by the battery remaining amount acquisition device; and a travelable range display device (33) that simultaneously displays on the display device a plurality of travelable ranges calculated by the travelable range calculation device.

The term "vehicle" as used herein refers to electric vehicles in which a motor driven by electric power supplied from a battery is used as a drive source and hybrid vehicles in which a motor and an engine are used in combination as drive sources.

The term "travelable range of the vehicle after the battery is charged" refers to a range in which the vehicle can travel before electric power accumulated in the battery after being charged is used up (with combined use of an engine in the case of hybrid vehicles).

According to the map display apparatus configured as described above, a minimum charge time required to travel to a destination can be displayed in a manner easily understandable to a user without obliging the user to perform intricate operations that may take a long time, and can also save the user from charging the battery more than necessary. Thus, it is possible to enhance the convenience experienced by the user.

The map display apparatus (1) according to the present invention may further include a gradient information acquisition device (33) that acquires information on road gradients, and the travelable range calculation device (33) may calculate the travelable range of the vehicle (2) after the battery is charged on the basis of the road gradients.

According to the map display apparatus configured as described above, it is possible to calculate the travelable range of the vehicle with more accuracy in consideration of the road gradients. Thus, it is possible to inform the user of a minimum charge time required to travel to a destination with more accuracy.

The map display apparatus (1) according to the present invention may further include a traffic information acquisition device (33) that acquires traffic information, and the travelable range calculation device (33) may calculate the travelable range of the vehicle (2) after the battery is charged on the basis of the traffic information.

According to the map display apparatus configured as described above, it is possible to calculate the travelable range of the vehicle with more accuracy in consideration of traffic information such as traffic congestion information and information on traffic restrictions, for example. Thus, it is possible to inform the user of a minimum charge time required to travel to a destination with more accuracy.

The map display apparatus (1) according to the present invention may further include a vehicle operation history storage device (46) that stores past vehicle operations performed by a driver, and the travelable range calculation device (33) may calculate the travelable range of the vehicle (2) after the battery is charged on the basis of the past vehicle operations performed by the driver.

According to the map display apparatus configured as described above, it is possible to acquire knowledge of operation characteristics of the driver from vehicle operations performed by the driver in the past, which makes it possible to predict the charge amount and the discharge amount of the battery during travel of the vehicle. Thus, it is possible to calculate the travelable range of the vehicle with more accuracy.

The map display apparatus (1) according to the present invention may further include a reduction device (33) that reduces the travelable range calculated by the travelable range calculation device (33), and the travelable range display device may display the travelable range reduced by the reduction device on the display device.

According to the map display apparatus configured as described above, the travelable range is reduced to a range that can be reliably traveled on the remaining amount of the battery after being charged in consideration of an inevitable error in the calculation results of the travelable range. Thus, there is no risk of the remaining amount of the battery becoming insufficient while the vehicle is traveling to a destination. Calculation of an accurate travelable range requires various information and complicated computation processing. However, by reducing the travelable range, it is possible to specify a travelable range in which the vehicle can reliably travel while alleviating the processing load on a control unit.

In the map display apparatus (1) according to the present invention, the reduction device (33) may reduce the travelable range at a higher reduction rate as the charge time for the travelable range becomes longer.

According to the map display apparatus configured as described above, the travelable range is reduced to a range that can be reliably traveled in consideration of the fact that a larger error occurs in the calculation results as the charge time for the travelable range becomes longer, that is, as the travelable range becomes broader.

Thus, there is no risk of the remaining amount of the battery becoming insufficient while the vehicle is traveling to a destination.

The map display apparatus (1) according to the present invention may further include: a category selection device (34) that allows selection of a category of facilities; and a facility display device (33) that displays on the display device (15) facilities that belong to the category selected using the category selection device and which are located within the travelable range calculated by the travelable range calculation device (33).

According to the map display apparatus configured as described above, when a category of facilities to be set as a destination is determined in advance by the user, a charge time required to reach facilities belonging to the determined category can be displayed in a manner easily understandable to the user, and can also save the user from charging the battery more than necessary. Thus, it is possible to enhance the convenience experienced by the user.

The present invention also provides a map display method including: a map display step (S9) of displaying a map of an area around a vehicle on a display device (15); a battery remaining amount acquisition step (S2) of acquiring a remaining amount of a battery (7) that supplies electric power to a motor (5) that produces a drive force for the vehicle (2); a travelable range calculation step (S8) of calculating a travelable range of the vehicle after the battery is charged for each of a plurality of various charge times on the basis of the remaining amount of the battery acquired at the battery remaining amount acquisition step; and a travelable range display step (S9) of simultaneously displaying on the display device a plurality of travelable ranges calculated at the travelable range calculation step.

According to the map display method configured as described above, a minimum charge time required to travel to a destination can be displayed in a manner easily understandable to a user without obliging the user to perform intricate operations that may take a long time, and can also save the user from charging the battery more than necessary. Thus, it is possible to enhance the convenience experienced by the user.

The present invention also provides a computer-readable tangible medium storing computer-executable instructions that execute in a processor a method including: a map display step (S9) of displaying a map of an area around a vehicle on a display device (15); a battery remaining amount acquisition step (S2) of acquiring a remaining amount of a battery (7) that supplies electric power to a motor (5) that produces a drive force for the vehicle (2); a travelable range calculation step (S8) of calculating a travelable range of the vehicle after the battery is charged for each of a plurality of various charge times on the basis of the remaining amount of the battery acquired at the battery remaining amount acquisition step; and a travelable range display step (S9) of simultaneously displaying on the display device a plurality of travelable ranges calculated at the travelable range calculation step.

According to the computer-readable tangible medium configured as described above, a minimum charge time required to travel to a destination can be displayed in a manner easily understandable to a user without obliging the user to perform intricate operations that may take a long time, and can also save the user from charging the battery more than necessary. Thus, it is possible to enhance the convenience experienced by the user.

DESCRIPTION OF THE REFERENCE NUMERALS

1 NAVIGATION APPARATUS
2 VEHICLE
3 ELECTRIC DRIVE VEHICLE CONTROL SYSTEM
4 ENGINE
5 DRIVE MOTOR
15 LIQUID CRYSTAL DISPLAY
16 SPEAKER
33 NAVIGATION ECU
46 VEHICLE OPERATION HISTORY DB
47 MAP INFORMATION DB

BEST MODES FOR CARRYING OUT THE INVENTION

Figure 1:
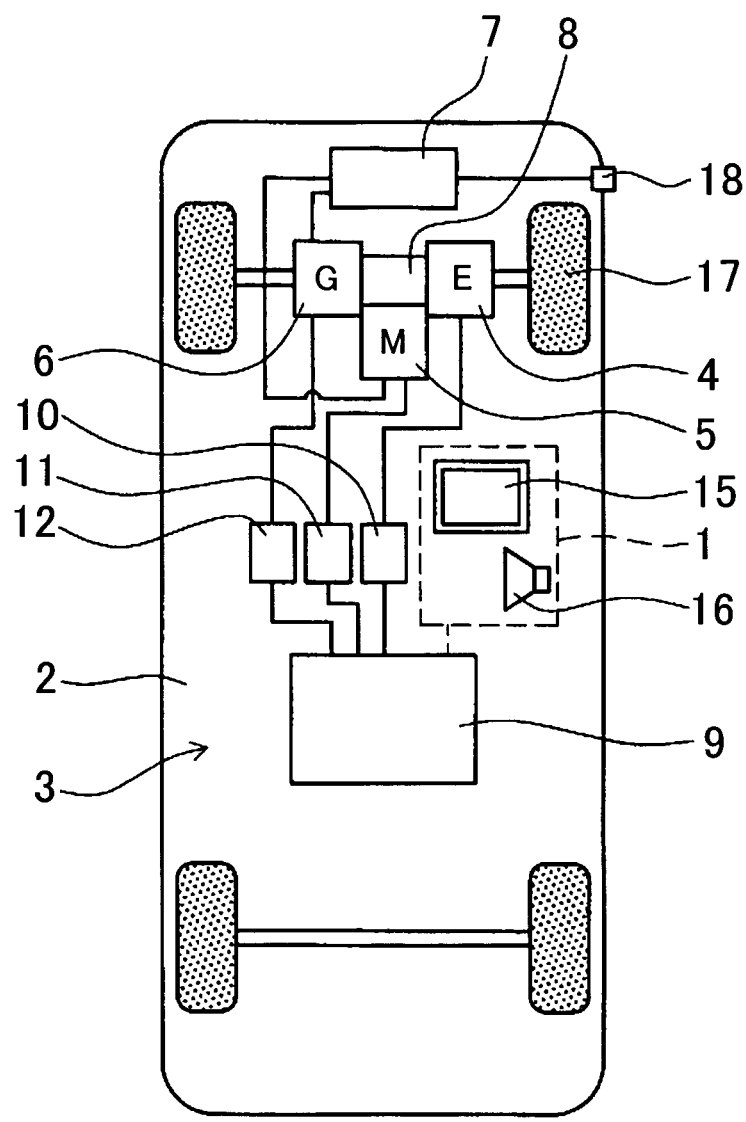
FIG. 1 shows a schematic configuration of an electric drive vehicle control system according to an embodiment.
Figure 2:
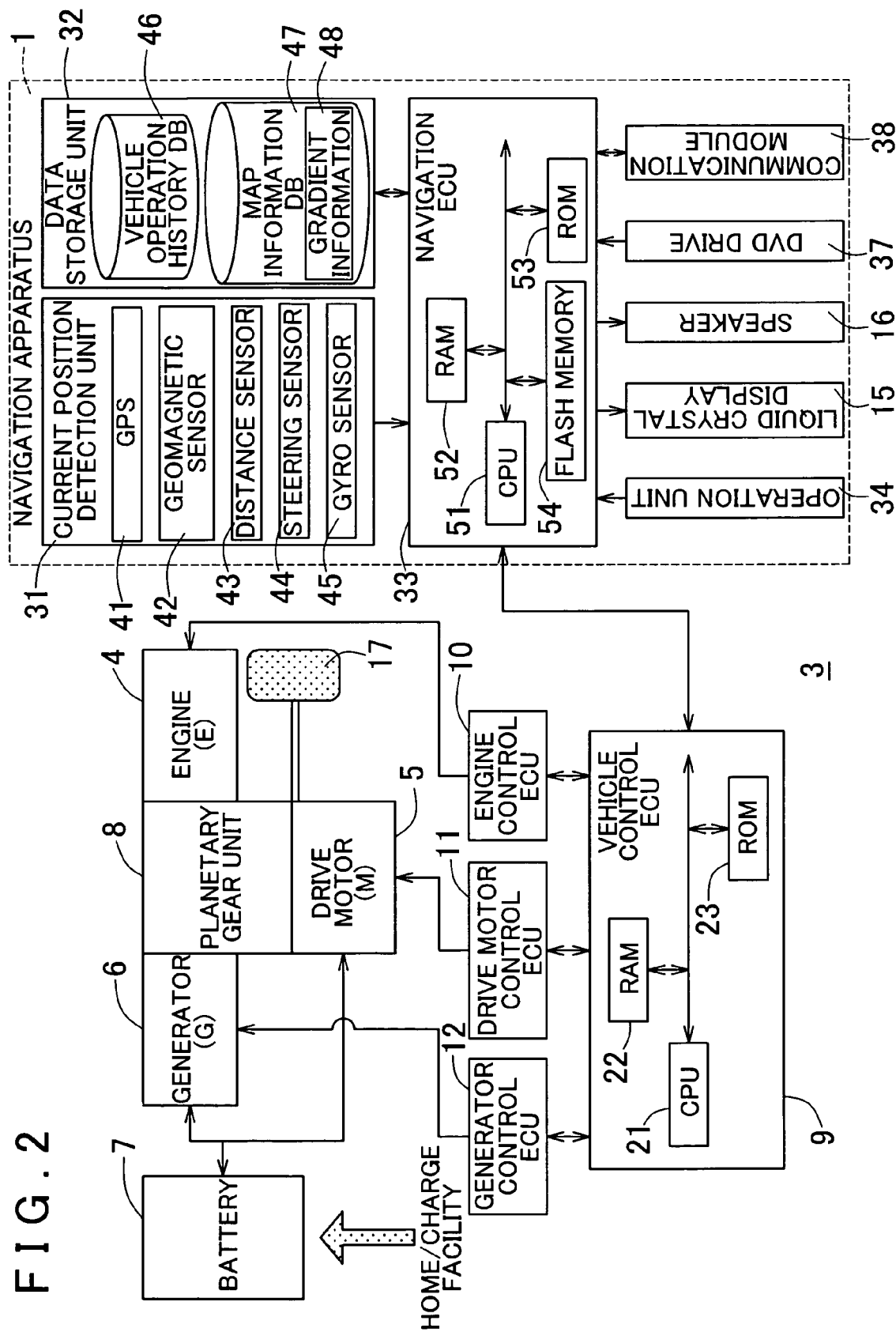
FIG. 2 is a block diagram schematically showing a control system of the electric drive vehicle control system according to the embodiment.

A map display apparatus, embodied as a navigation apparatus, according to an embodiment of the present invention will be described in detail below with reference to the drawings. First, a schematic configuration of an electric drive vehicle control system 3 for an electric drive vehicle 2 that incorporates a navigation apparatus 1 according to the embodiment as an onboard device will be described with reference to FIGS. 1 and 2. FIG. 1 shows a schematic configuration of the electric drive vehicle control system 3 according to the embodiment. FIG. 2 is a block diagram schematically showing a control system of the electric drive vehicle control system 3 according to the embodiment. While electric drive vehicles include electric vehicles in which only a motor is used as a drive source and hybrid vehicles in which a motor and an engine are used in combination as drive sources, a hybrid vehicle is used in the embodiment described below.

As shown in FIGS. 1 and 2, the electric drive vehicle control system 3 according to the embodiment basically includes the navigation apparatus 1 installed in the vehicle 2, an engine 4, a drive motor 5, a generator 6, a battery 7, a planetary gear unit 8, a vehicle control ECU 9, an engine control ECU 10, a drive motor control ECU 11, and a generator control ECU 12.

The navigation apparatus 1 is provided in the center console or a panel surface in the cabin of the vehicle 2, and includes a liquid crystal display 15 that displays a map of an area around the vehicle and a route to a destination, and a speaker 16 that outputs audio guidance related to route guidance. The navigation apparatus 1 specifies the current position of the vehicle 2 through a GPS or the like. If a destination is set, the navigation apparatus 1 searches for a route to the destination and provides guidance on the set route using the liquid crystal display 15 and the speaker 16. In the navigation apparatus 1 according to the embodiment, when charging the battery 7, the liquid crystal display 15 simultaneously displays a plurality of travelable ranges after the battery 7 is charged for each of a plurality of various charge times, as explained later. The detailed configuration of the navigation apparatus 1 will be described in detail later.

The engine 4 is an engine such as an internal combustion engine driven by a fuel such as gasoline, diesel, or ethanol, and is used as a first drive source of the vehicle 2. An engine torque that is a drive force of the engine 4 is transferred to the planetary gear unit 8, which distributes a part of the engine torque to drive wheels 17 that rotate to drive the vehicle 2.

The drive motor 5 is a motor rotatingly operated by electric power supplied from the battery 7, and is used as a second drive source of the vehicle 2. The drive motor is driven by electric power supplied from the battery 7 to produce a drive motor torque that is a drive force of the drive motor 5. The produced drive motor torque rotates the drive wheels 17 to drive the vehicle 2. For hybrid vehicles in particular, the drive motor 5 is used to drive the vehicle 2 when the efficiency of the engine 4 is low, for example, when the vehicle 2 is starting off or running at a low speed on an upward slope. When the vehicle 2 accelerates, both the engine 4 and the drive motor 5 are used to produce a drive force to drive the vehicle 2.

Further, when engine braking is required or the vehicle is braking to a stop, the drive motor 5 serves as a regenerative brake to regenerate vehicle inertial energy into electrical energy. Specifically, when the engine 4 is not producing its full power, for example, when the vehicle 2 is running steadily at a low to middle speed or running on a downward slope, the drive motor 5 functions as a generator to charge the battery 7 depending on the remaining amount of the battery 7. In particular, when engine braking is required on a downward slope, regenerative electric power produced by the drive motor 5 functioning as a generator can be increased to obtain a sufficient engine braking effect. When a driver depresses the foot brake pedal to stop the vehicle 2, regenerative electric power produced by the drive motor 5 is further increased so that the drive motor 5 operates as a regenerative brake to regenerate inertial energy of the vehicle 2 into electric power and to reduce energy dissipation through heat produced by friction brakes. In the middle speed range, the drive motor 5 performs regeneration to operate the engine 4 in a region with a higher output and a higher efficiency. This not only improves the engine efficiency but also increases the motor running distance with the battery 7 charged through the regeneration described above, which improves the energy efficiency. Examples of the drive motor 5 include an AC motor and a DC brushless motor.

The generator 6 is a power generation device driven by a part of the engine torque distributed by the planetary gear unit 8 to generate electric power. The generator 6 is connected to the battery 7 via a generator inverter (not shown) so that a generated AC current is converted into a DC current before being supplied to the battery 7. The drive motor 5 and the generator 6 may be formed integrally with each other.

The battery 7 is a secondary battery serving as power accumulation means that can repeatedly charge and discharge electricity. Examples of the battery 7 include a lead-acid battery, a nickel-cadmium battery, a nickel-hydrogen battery, a lithium-ion battery, and a sodium-sulfur battery. The battery 7 is connected to a charge connector 18 provided on a sidewall of the vehicle 2. The battery 7 can be charged by connecting the charge connector 18 to an electric power supply source such as an outlet at home or at a charge facility provided with predetermined charge equipment. The battery 7 may also be charged by regenerative electric power produced by the drive motor and electric power generated by the generator.

The planetary gear unit 8 includes a sun gear, a pinion, a ring gear, and a carrier, and distributes a part of the drive force of the engine 4 to the generator 6 and transfers the remaining drive force to the drive wheels 17.

The vehicle control ECU (electronic control unit) 9 is an electronic control unit that controls the entire vehicle 2. The vehicle control ECU 19 is connected to the engine control ECU 10 which controls the engine 4, the drive motor control ECU 11 which controls the drive motor 5, the generator control ECU 12 which controls the generator 6, and a navigation ECU 33 provided in the navigation apparatus 11 to be explained later.

The vehicle control ECU 9 includes a CPU 21 serving as a computation device and a control device, and internal storage devices such as a RAM 22 used as a working memory when the CPU 21 performs various computation processes and a ROM 23 storing control programs and so forth.

The engine control ECU 10, the drive motor control ECU 11, and the generator control ECU 12 each include a CPU, a RAM, and a ROM not shown in the drawings, and respectively control the engine 4, the drive motor 5, and the generator 6.

Now, the configuration of the navigation apparatus 1 will be described with reference to FIG. 2.

As shown in FIG. 2, the navigation apparatus 1 according to the embodiment includes a current position detection unit 31 that detects the current position of the vehicle, a data storage unit 32 that stores various data, a navigation ECU (a battery remaining amount acquisition device, a travelable range calculation device, a travelable range display device, a gradient information acquisition device, a traffic information acquisition device, a reduction device, and a facility display device) 33 that performs various computation processes, an operation unit (a category selection device) 34 that accepts an operation from a user, a liquid crystal display (a display device) 15 that shows to the user a map of an area around the vehicle and a travelable range of the vehicle 2 based on a battery charge time, a speaker 16 that outputs audio guidance related to route guidance, a DVD drive 37 that reads a DVD serving as a storage medium that stores programs, and a communication module 38 that communicates with an information center such as a traffic information center. Sensors such as a vehicle speed sensor that detects the traveling speed of the vehicle are connected to the navigation ECU 33.

The constituent elements of the navigation apparatus 1 will be described in order below.

The current position detection unit 31 includes a GPS 41, a geomagnetic sensor 42, a distance sensor 43, a steering sensor 44, a gyro sensor 45 serving as a heading detection sensor, and an altimeter (not shown), and can detect the current position, heading, and so forth of the vehicle.

The data storage unit 32 includes a hard disk (not shown) serving as an external storage device and a storage medium, a vehicle operation history DB 46 and a map information DB 47 stored in the hard disk, and a read/write head (not shown) serving as a drive that reads out predetermined programs and so forth from and writes predetermined data onto the hard disk.

The vehicle operation history DB 46 is a database that stores a vehicle operation history of the driver. Specifically, the vehicle operation history DB 46 cumulatively stores links traveled by the vehicle in the past, and the number of foot brake pedal operations and the degrees of accelerator pedal depression performed by the driver for each link. The navigation ECU 33 derives vehicle operation characteristics of the driver on the basis of the vehicle operation history information stored in the vehicle operation history DB 46 to calculate a travelable range of the vehicle 2 based on the charge time of the battery 7 as explained later.

The map information DB 47 stores various map data required for route guidance, traffic information guidance, and map display. Specifically, the map data include facility data on facilities such as restaurants and parking lots, link data on road (link) geometry, node data on node points, intersection data on intersections, route search data for finding routes, location search data for finding locations, and image rendering data for rendering images such as maps, roads, and traffic information on the liquid crystal display 15. In the navigation apparatus 1 according to the embodiment, in particular, gradient information 48 on road gradients is also stored. The navigation ECU 33 calculates a travelable range of the vehicle 2 based on the charge time of the battery 7 on the basis of the road geometry of links around the vehicle and the gradient information 48 as explained later.

The navigation ECU (electronic control unit) 33 is an electronic control unit that controls the entire navigation apparatus 1 through a guide route setting process for setting a guide route from the current position to a selected destination, a travelable range calculation process for calculating a travelable range of the vehicle after the battery is charged for each of a plurality of various charge times, a travelable range display process for displaying a plurality of calculated travelable ranges at the same time on the liquid crystal display 15, and so forth. The navigation ECU 33 also includes a CPU 51 serving as a computation device and a control device, and internal storage devices such as a RAM 52 used as a working memory when the CPU 51 performs various computation processes and storing route data when a route is found, a ROM 53 storing control programs, a travelable range display processing program (see FIG. 3), and so forth, and a flash memory 54 storing programs read out from the ROM 53.

The operation unit 34 is operated to input a departure location at which guidance is started and a destination at which guidance is terminated, and includes a plurality of operation switches (not shown) such as various keys and buttons. In the navigation apparatus 1 according to the embodiment, in particular, the operation unit 34 is also used to select a category of facilities to be displayed over a map when a travelable range of the vehicle 2 based on the charge time of the battery 7 is displayed. The navigation ECU 33 performs controls to execute various corresponding operations on the basis of switch signals output in response to the depression of each switch, for example. The operation unit 34 may include a touch panel provided at the front of the liquid crystal display 15.

The liquid crystal display 15 displays a map image that includes roads, traffic information, operational guidance, an operation menu, key guidance, a guide route from the current position to a destination, guidance information for travel along the guide route, news, weather forecasts, the time, mail, and television programs. When charging the battery 7 of the vehicle 2, the liquid crystal display 15 simultaneously displays respective travelable ranges for a plurality of various charge times over the map image.

The speaker 16 outputs audio guidance for travel along a guide route and guidance on traffic information on the basis of commands from the navigation ECU 33.

The DVD drive 37 is a drive that can read data stored in a storage medium such as a DVD and a CD. The map information DB 47 is updated, for example, on the basis of the read data.

The communication module 38 is a communication device that receives traffic information including traffic congestion information, restriction information, parking lot information, and traffic accident information transmitted from a traffic information center such as a VICS (registered trademark:

Vehicle Information and Communication System) center and a probe center, and may be a cellular phone or a DCM, for example. Information received by the communication module 38, such as traffic congestion information and restriction information, is used to calculate a travelable range of the vehicle 2 based on the charge time of the battery 7 as explained later.

Figure 3:
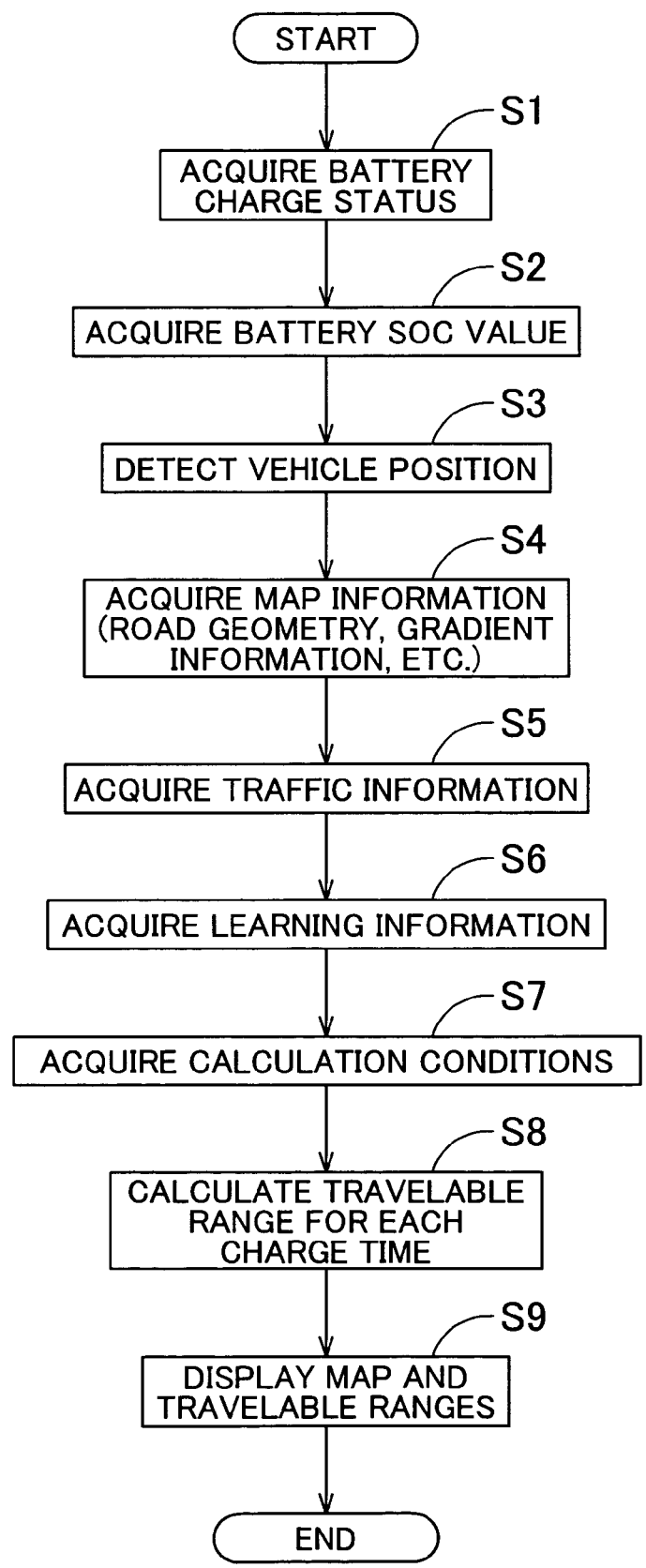
FIG. 3 is a flowchart of a travelable range display processing program according to the embodiment.

Now, a travelable range display processing program executed by the navigation ECU 33 of the navigation apparatus 1 configured as described above will be described with reference to FIG. 3. FIG. 3 is a flowchart of the travelable range display processing program according to the embodiment. The travelable range display processing program is a program executed when charging of the battery 7 of the vehicle 2 is started or when the user performs a predetermined operation using the operation unit 34. The travelable range display processing program calculates a travelable range of the vehicle after the battery is charged for each of a plurality of various charge times and simultaneously displays a plurality of calculated travelable ranges on the liquid crystal display 15. The program shown in the flowchart of FIG. 3 described below is stored in the RAM 52 or the ROM 53 of the navigation apparatus 1, and executed by the CPU 51.

In the travelable range display processing program, first, at step (hereinafter abbreviated as "S") 1, the CPU 51 acquires the charge status of the battery 7 installed in the vehicle from the vehicle control ECU 9. Specifically, it is first determined whether or not the battery is currently being charged. If the battery is being charged, the CPU 51 acquires the amount of increase of the remaining amount of the battery per unit time (hereinafter referred to as a "charge rate"). On the other hand, if the battery is not being charged, the CPU 51 estimates the charge rate at which the battery is assumed to be charged on the basis of a past charge history. The charge rate at which the battery is assumed to be charged may be estimated as an average value of past charge rates used in the past, for example.

Then, at S2, the CPU 51 acquires an SOC value of the battery 7 (the remaining amount of the battery 7) installed in the vehicle from the vehicle control ECU 9. The process at S2 is equivalent to the process performed by the battery remaining amount acquisition device.

Subsequently, at S3, the CPU 51 detects the current position of the vehicle using the current position detection unit 31. The CPU 51 also performs map matching to specify the detected current position of the vehicle on a map.

Thereafter, at S4, the CPU 51 reads out map information on an area around the vehicle position (for example, an area within 10 km of the vehicle) from the map information DB 47. Examples of the map information read out at S4 include information on road geometry (including distances, coordinates, and radii of curves) and gradient information on road gradients. The process at S4 is equivalent to the process performed by the gradient information acquisition device.

Further, at S5, the CPU 51 acquires traffic information from a VICS center or a probe center via the communication module 38. Examples of the traffic information acquired at S5 include traffic congestion information and information on traffic restrictions such as road closures and lane closures. The process at S5 is equivalent to the process performed by the traffic information acquisition device.

Subsequently, at S6, the CPU 51 acquires the vehicle operation characteristics of the driver as learning information. The vehicle operation characteristics are derived by statistically processing the past vehicle operation history stored cumulatively in the vehicle operation history DB 46, and may include the number of foot brake pedal operations and the degrees of accelerator pedal depression performed by the driver for each link around the vehicle. Based on such information, the navigation ECU 33 can calculate the amount of charge supplied to the battery 7 through driving of the generator 6 and regeneration of the drive motor 5 and the amount of electric power consumed by the battery 7.

Thereafter, at S7, the CPU 51 acquires conditions for calculating travelable ranges. Examples of the conditions for calculating travelable ranges acquired at S7 include (a) battery charge times (normally three different charge times of 10 minutes, 20 minutes, and 30 minutes) to calculate travelable ranges, and (b) which of one-way travelable ranges and round-trip travelable ranges are to be displayed for the current position of the vehicle. The calculation conditions may be changed on the basis of an operation performed by the user using the operation unit 34.

Further, at S8, the CPU 51 calculates a travelable range of the vehicle after the battery 7 is charged for each of a plurality of various charge times on the basis of the battery SOC value acquired at S2 and the various information acquired at S1 and S3 to S7.

An exemplary calculation process for calculating a travelable range at S8 will be described below. First, the CPU 51 calculates the remaining amount of the battery after being charged for each of various charge times (normally, three different charge times of 10 minutes, 20 minutes, and 30 minutes) from the charge rate acquired at S1. Thereafter, the CPU 51 acquires the geometry of roads around the current position of the vehicle, and specifies respective reachable locations that can be reached from the vehicle position if the vehicle travels the roads around the vehicle through all possible routes on the assumption that the roads are flat. At this time, the CPU 51 calculates the amount of charge supplied to the battery 7 through driving of the generator 6 and regeneration of the drive motor 5 and the amount of electric power consumed by the battery 7 while the vehicle travels through each route, based on the vehicle operation history of the driver acquired at S6 and the traffic congestion information and the restriction information acquired at S5, and uses the calculated values.

Further, the CPU 51 adjusts the reachable locations in consideration of the road gradients acquired at S4. Specifically, if there are more downward slopes, the battery is charged more through regeneration of the drive motor 5, and therefore the distance to the reachable location is increased. On the other hand, if there are more upward slopes, the vehicle 2 is driven more by the drive motor 5, and therefore the distance to the reachable location is reduced. Then, a travelable range is obtained by connecting the reachable locations for the respective routes. The process at S8 is equivalent to the process performed by the travelable range calculation device.

Thereafter, at S9, the CPU 51 simultaneously displays a plurality of travelable ranges corresponding to the various charge times calculated at S8 on the liquid crystal display 15. If a map of the area around the vehicle position is not yet displayed on the liquid crystal display 15, a map of the area around the vehicle position is also displayed on the liquid crystal display 15. As a result, the plurality of travelable ranges corresponding to the various charge times is displayed over the map of the area around the vehicle position.

Figure 4:
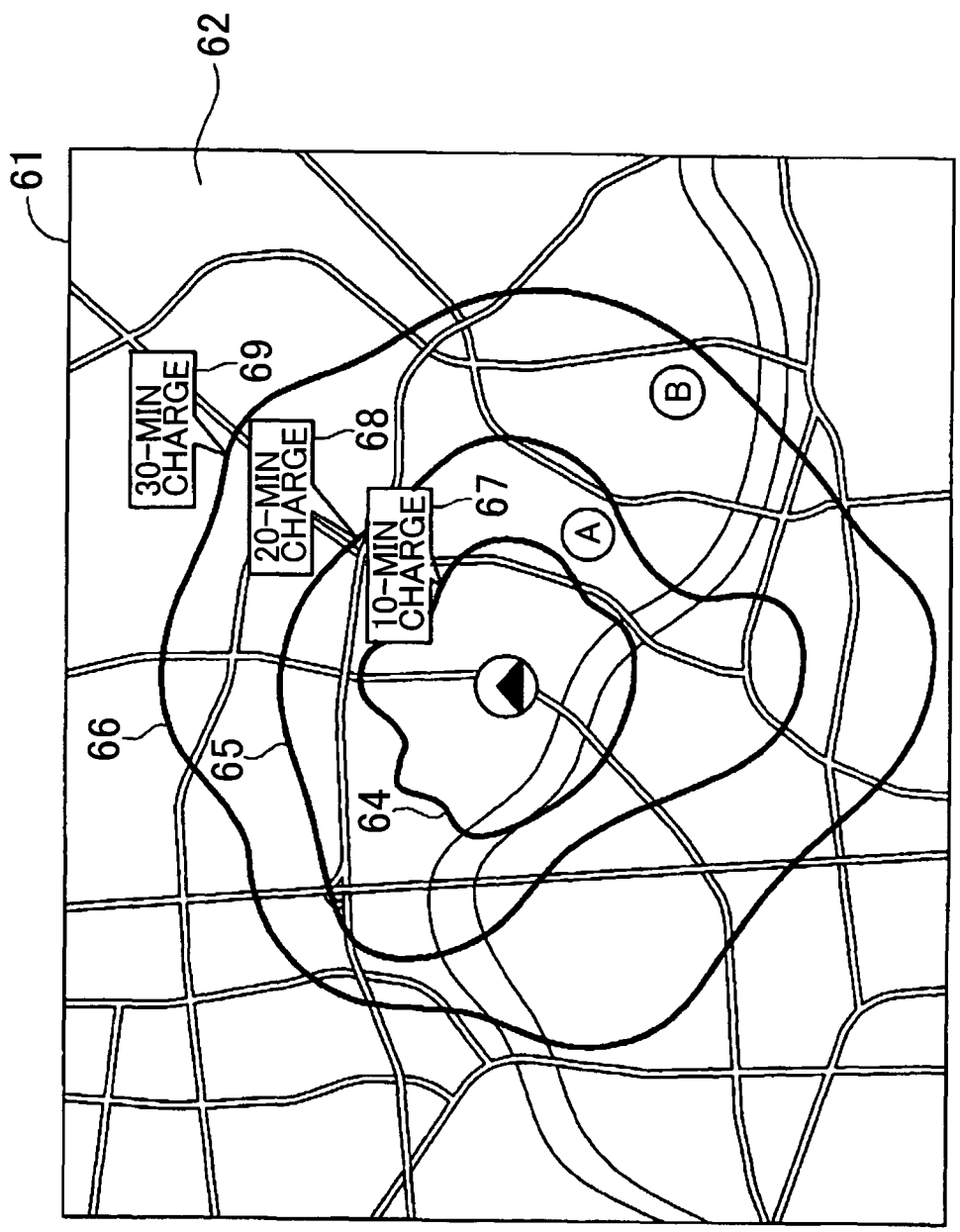
FIG. 4 shows an exemplary display screen of a liquid crystal display on which travelable ranges are displayed at step 9.

FIG. 4 shows an exemplary display screen of the liquid crystal display 15 on which the travelable ranges are displayed at S9. In FIG. 4, the travelable ranges for the three various charge times of 10 minutes, 20 minutes, and 30 minutes are shown.

As shown in FIG. 4, a display screen 61 of the liquid crystal display 15 displays a map image 62 of an area around the vehicle position, a vehicle position mark 63 indicating the current position of the vehicle matched with the map, three different travelable ranges 64 to 66 indicated around the vehicle position mark 63 as contour lines, and charge time display portions 67 to 69 each indicating a charge time corresponding to each travelable range. The travelable ranges 64 to 66 are depicted as boundary lines arranged as contour lines which indicate the farthest reachable locations for each charge time. By referencing the travelable ranges 64 to 66, the user can easily acquire knowledge of a range in which the vehicle can travel before electric power accumulated in the battery charged according to each charge time is used up.

By allowing the simultaneous display of a plurality of travelable ranges for different charge times, the user can easily acquire knowledge of a minimum charge time required to travel to a user destination on the map image 62. Specifically, if a location A shown in FIG. 4 is the user destination, it can be understood that the destination is reachable by charging the battery 7 for at least 20 minutes. If a location B shown in FIG. 4 is the use destination, it can be understood that the destination is reachable by charging the battery 7 for at least 30 minutes. Thus, by referencing the liquid crystal display 15, the user does not have to charge the battery for a long time but can charge the battery only by the minimum amount required to travel to the location A or B. The process at S9 is equivalent to the process performed by the travelable range display device.

While the travelable ranges 64 to 66 are depicted as boundary lines resembling contour lines in FIG. 4, the travelable ranges 64 to 66 may be color-coded. Further, while one-way travelable ranges from the current position of the vehicle are shown in FIG. 4, round-trip travelable ranges may be shown on the basis of a setting performed by the user.

In a modification of the embodiment, a travelable range reduction process for reducing the travelable ranges calculated in the process at S8 may be performed to display reduced travelable ranges in the process at S9.

Figure 5:
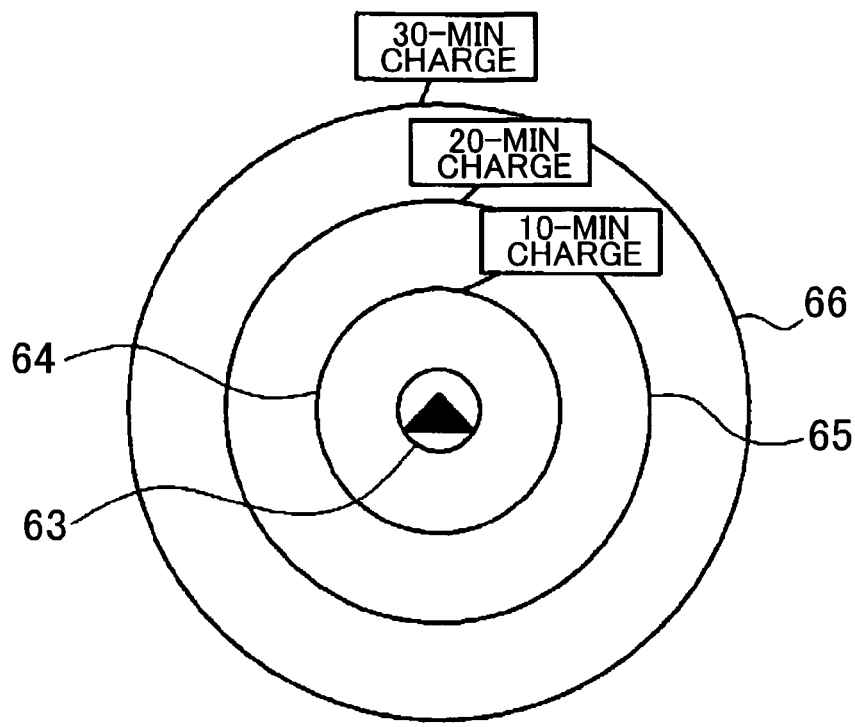
FIG. 5 is a schematic view showing the travelable ranges before being reduced by a travelable range reduction process.
Figure 6:
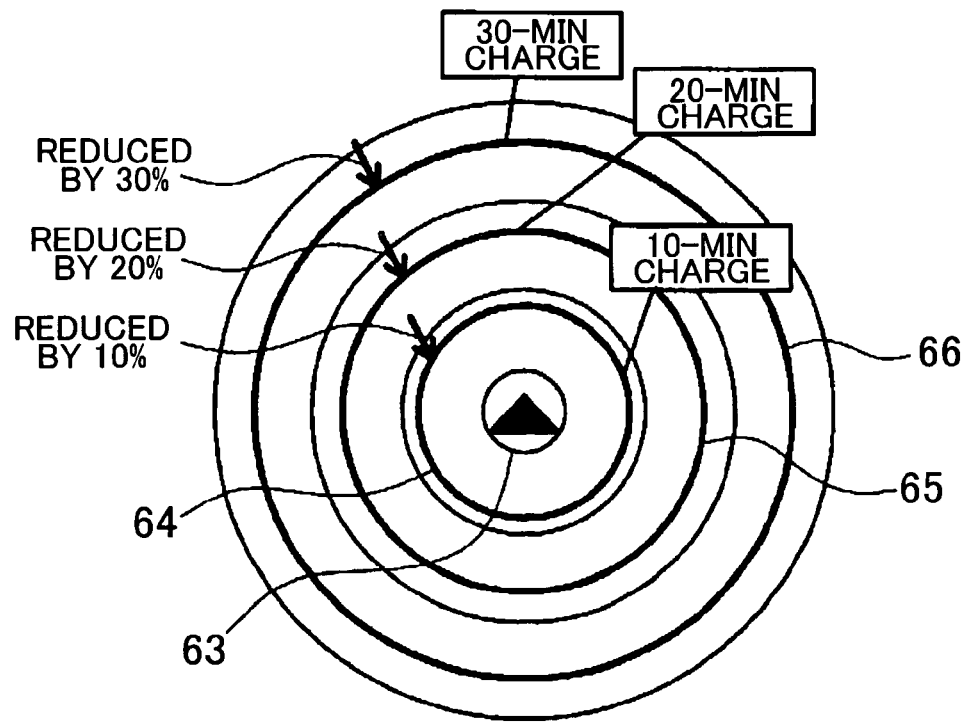
FIG. 6 is a schematic view showing the travelable ranges after being reduced by the travelable range reduction process.

FIG. 5 is a schematic view showing the travelable ranges 64 to 66 before being reduced by the travelable range reduction process. FIG. 6 is a schematic view showing the travelable ranges 64 to 66 after being reduced by the travelable range reduction process. In the embodiment shown in FIGS. 5 and 6, the travelable range 64 temporarily calculated for a charge time of 10 minutes is reduced by 10%, the travelable range 65 temporarily calculated for a charge time of 20 minutes is reduced by 20%, and the travelable range 66 temporarily calculated for a charge time of 30 minutes is reduced by 30%. Each of the travelable ranges 64 to 66 is reduced to a range that can be reliably traveled on the remaining amount of the battery 7 after being charged in consideration of an inevitable error in the calculation results of the travelable range. Thus, by using the reduced travelable ranges 64 to 66 as a reference, there is no risk of the remaining amount of the battery 7 becoming insufficient while the vehicle is traveling to a destination. It is possible to display the travelable ranges 64 to 66 that can be traveled more reliably by reducing the travelable range at a higher reduction rate as the charge time for the travelable range becomes longer in consideration of the fact that a larger error occurs in the calculation results as the charge time for the travelable range becomes longer, that is, as the travelable range becomes broader.

Calculation of an accurate travelable range requires various information and complicated computation processing. However, by reducing the travelable range, it is possible to specify a travelable range in which the vehicle can reliably travel while alleviating the processing load on the control unit.

Further, in another modification, the user may select a category of facilities using the operation unit 34 after the travelable ranges 64 to 66 are displayed on the liquid crystal display 15 in the process at S9, such that the navigation ECU 33 executes a facility display process that displays on the liquid crystal display 15 facilities belonging to the selected category that are located within the travelable ranges.

Figure 7:
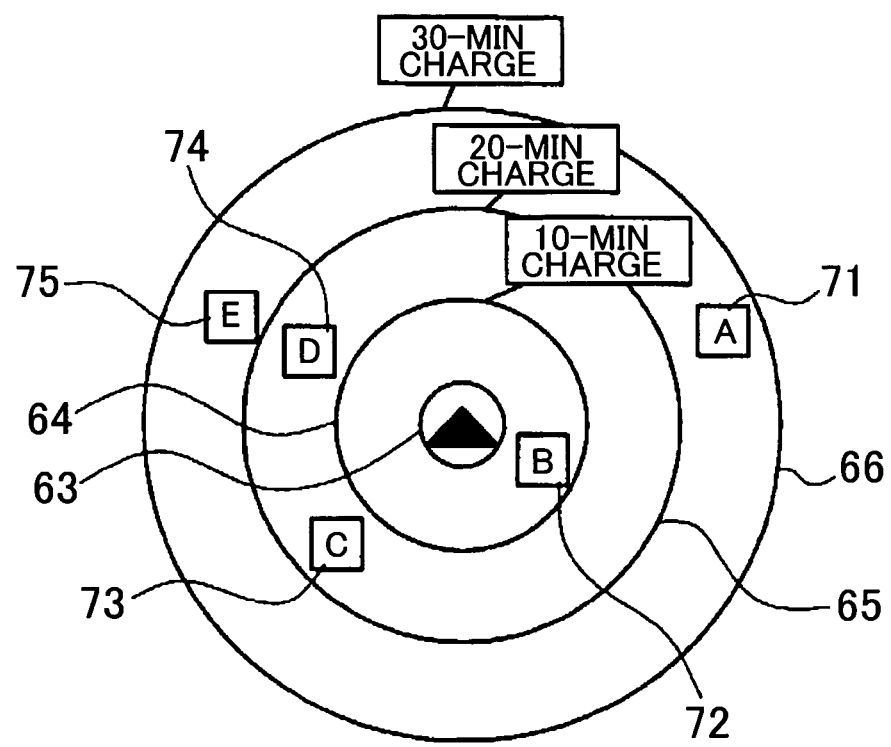
FIG. 7 is a schematic view showing facilities displayed when a user selects "Supermarkets" from categories of facilities.

FIG. 7 is a schematic view showing facilities 71 to 75 displayed when the user selects "Supermarkets" from categories of facilities. In the embodiment shown in FIG. 7, the navigation ECU 33 finds that five supermarkets A to E are located within the travelable ranges 64 to 66, and displays the positions of the facilities on the liquid crystal display 15. By referencing the facilities and the travelable ranges 64 to 66 displayed on the liquid crystal display 15, the user can easily acquire knowledge of the charge time required to reach each facility. This enables the user to select whether to wait a charge time of 30 minutes to buy a desired item at the supermarket A at a lower price or to wait a charge time of only 10 minutes to buy the item at the supermarket B at a higher price, for example.

Rather than displaying on the liquid crystal display 15 only facilities belonging to a category selected by the user, facilities belonging to a category selected by the user from among all the facilities displayed in advance on the liquid crystal display 15, may be displayed in an emphasized manner (for example, displayed in a different color or flashed on and off). Further, the travelable range reduction process described above may be applied in combination.

As described in detail above, according to the navigation apparatus 1 of the embodiments, a map display method performed by the navigation apparatus 1, and a computer program executed by the navigation apparatus 1, the current SOC value of the battery 7 of a hybrid vehicle in which the engine 4 and the drive motor 5 are used in combination, the geometry of roads around the vehicle, gradient information, traffic information, learning information, and so forth are acquired (S1 to S7). The travelable ranges 64 to 66 of the vehicle after the battery 7 is charged are calculated for a plurality of various charge times on the basis of the acquired information (S8), and the plurality of calculated travelable ranges 64 to 66 are simultaneously displayed on the liquid crystal display 15 (S9). Therefore, a minimum charge time required to travel to a destination can be displayed in a manner easily understandable to the user without obliging the user to perform intricate operations that may take a long time, and can also save the user from charging the battery more than necessary. Thus, it is possible to enhance the convenience experienced by the user.

The travelable ranges of the vehicle are calculated with more accuracy in consideration of road gradients, traffic congestion information, traffic restrictions, operation characteristics of the driver, and so forth. Therefore, it is possible to inform the user of a minimum charge time required to travel to a destination with more accuracy.

It should be understood that the present invention is not limited to the above embodiments, and that various improvements and modifications may of course be made without departing from the scope and spirit of the present invention.

For example, while the navigation apparatus installed in the hybrid vehicle calculates and displays the travelable ranges 64 to 66 in the embodiments, the process for calculating the travelable ranges 64 to 66 may be executed by an information center capable of mutual communication with the vehicle so that the vehicle receives and displays the calculation results on a display.

In the processes for calculating and displaying the travelable ranges 64 to 66, when the current remaining amount of the battery is not zero, a travelable range corresponding to the current remaining amount of the battery without charging may be calculated and displayed.

Although the present invention is applied to a hybrid vehicle in which a motor and an engine are used in combination as drive sources in the above embodiments, the present invention may also be applied to an electric vehicle in which only a motor is used as a drive source.

The invention claimed is:

1. A map display apparatus comprising:
   a display device that displays a map of an area around a vehicle;
   a battery remaining amount acquisition device that acquires a remaining amount of a battery that supplies electric power to a motor that produces a drive force for the vehicle;
   a calculation condition acquisition device that acquires, of a first calculation condition for calculating a range in which the vehicle can perform one-way travel as a travelable range and a second calculation condition for calculating a range in which the vehicle can perform round-trip travel as a travelable range, a currently set calculation condition as a condition for calculating a travelable range;
   a travelable range calculation device that calculates a travelable range, wherein the vehicle can perform one of one-way travel and round-trip travel after the battery is charged depending on the calculation condition acquired by the calculation condition acquisition device, for each of a plurality of various charge times on the basis of the remaining amount of the battery acquired by the battery remaining amount acquisition device; and
   a travelable range display device that simultaneously displays on the display device a plurality of travelable ranges calculated by the travelable range calculation device and the charge times respectively corresponding to the plurality of travelable ranges.

2. The map display apparatus according to claim 1, further comprising:
   a gradient information acquisition device that acquires information on road gradients, wherein
   the travelable range calculation device calculates the travelable range of the vehicle after the battery is charged on the basis of the road gradients.

3. The map display apparatus according to claim 1, further comprising:
   a traffic information acquisition device that acquires traffic information, wherein
   the travelable range calculation device calculates the travelable range of the vehicle after the battery is charged on the basis of the traffic information.

4. The map display apparatus according to claim 1, further comprising:
   a vehicle operation history storage device that stores past vehicle operations performed by a driver, wherein
   the travelable range calculation device calculates the travelable range of the vehicle after the battery is charged on the basis of the past vehicle operations performed by the driver.

5. The map display apparatus according to claim 1, further comprising:
   a reduction device that reduces the travelable range calculated by the travelable range calculation device, wherein
   the travelable range display device displays the travelable range reduced by the reduction device on the display device.

6. The map display apparatus according to claim 5, wherein the reduction device reduces the travelable range at a higher reduction rate as the charge time for the travelable range becomes longer.

7. The map display apparatus according to claim 1, further comprising:
   a category selection device that allows selection of a category of facilities; and
   a facility display device that displays on the display device facilities that belong to the category selected using the category selection device and which are located within the travelable range calculated by the travelable range calculation device.

8. A map display method comprising:
   a map display step of displaying a map of an area around a vehicle on a display device;
   a battery remaining amount acquisition step of acquiring a remaining amount of a battery that supplies electric power to a motor that produces a drive force for the vehicle;
   a calculation condition acquisition step of acquiring, of a first calculation condition for calculating a range in which the vehicle can perform one-way travel as a travelable range and a second calculation condition for calculating a range in which the vehicle can perform round-trip travel as a travelable range, a currently set calculation condition as a condition for calculating a travelable range;
   a travelable range calculation step of calculating a travelable range, wherein the vehicle can perform one of one-way travel and round-trip travel after the battery is charged depending on the calculation condition acquired at the calculation condition acquisition step, for each of a plurality of various charge times on the basis of the remaining amount of the battery acquired at the battery remaining amount acquisition step; and
   a travelable range display step of simultaneously displaying on the display device a plurality of travelable ranges calculated at the travelable range calculation step and the charge times respectively corresponding to the plurality of travelable ranges.

9. A computer-readable tangible medium storing computer-executable instructions that execute in a processor a method comprising:
   a map display step of displaying a map of an area around a vehicle on a display device;
   a battery remaining amount acquisition step of acquiring a remaining amount of a battery that supplies electric power to a motor that produces a drive force for the vehicle;
   a calculation condition acquisition step of acquiring, of a first calculation condition for calculating a range in which the vehicle can perform one-way travel as a travelable range and a second calculation condition for calculating a range in which the vehicle can perform round-trip travel as a travelable range, a currently set calculation condition as a condition for calculating a travelable range;
   a travelable range calculation step of calculating a travelable range, wherein the vehicle can perform one of one-way travel and round-trip travel after the battery is charged depending on the calculation condition acquired at the calculation condition acquisition step, for each of a plurality of various charge times on the basis of the remaining amount of the battery acquired at the battery remaining amount acquisition step; and a travelable range display step of simultaneously displaying on the display device a plurality of travelable ranges calculated at the travelable range calculation step and the charge times respectively corresponding to the plurality of travelable ranges.

* * * * *

UNITED STATES PATENT AND TRADEMARK OFFICE
CERTIFICATE OF CORRECTION

PATENT NO. : 8,417,401 B2
APPLICATION NO. : 12/452618
DATED : April 9, 2013
INVENTOR(S) : Masatoshi Takahara et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 419 days.

Signed and Sealed this
Twentieth Day of August, 2013

Teresa Stanek Rea
*Acting Director of the United States Patent and Trademark Office*